(No Model.) 3 Sheets—Sheet 3.
G. F. CLEMONS.
APPARATUS FOR TRANSMITTING DIFFERENTIAL ROTARY MOTION.
No. 276,776. Patented May 1, 1883.
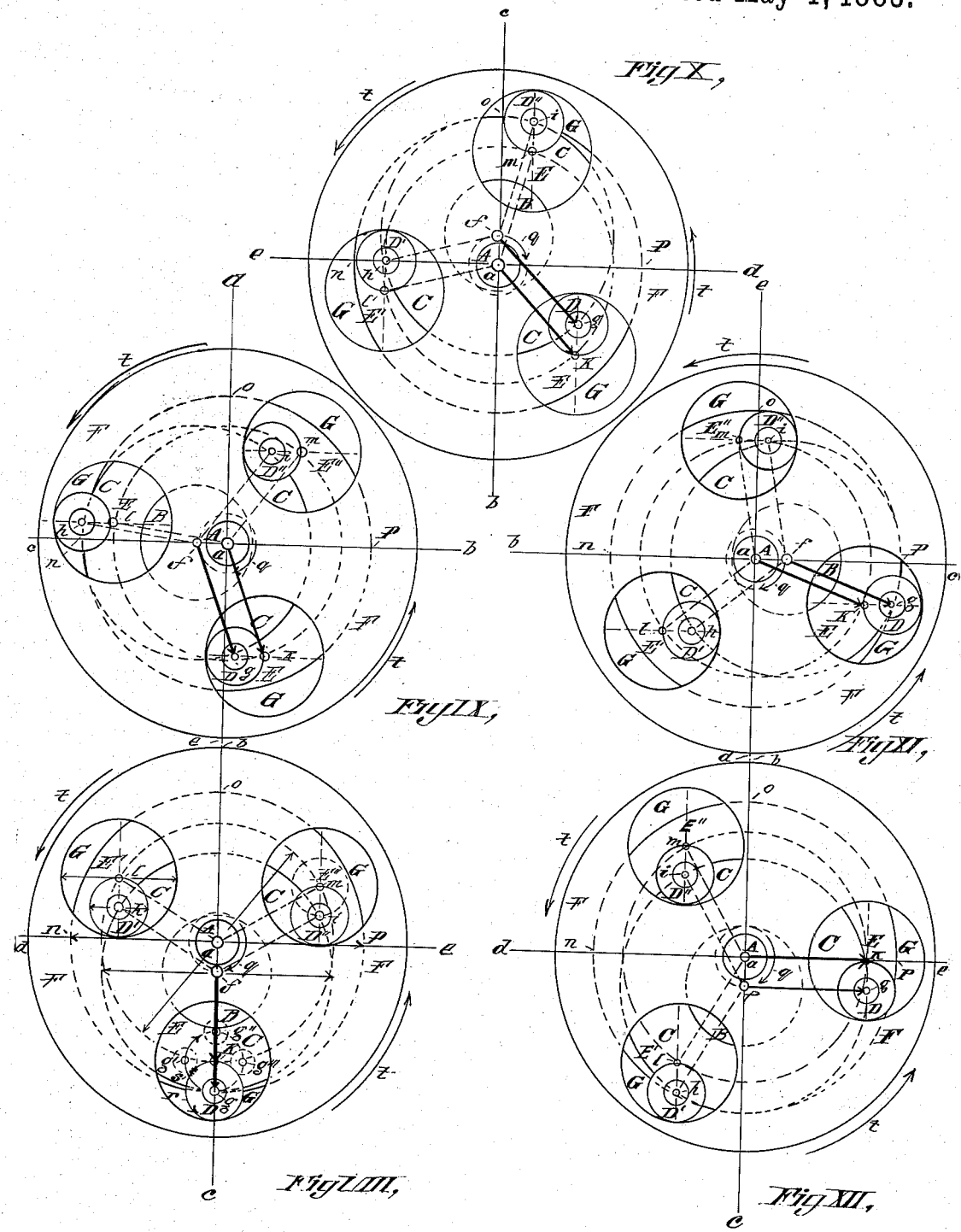
Witnesses:
R. F. Hyde
Wm H Chapin
Inventor,
G. F. Clemons
By Henry A Chapin
Atty.

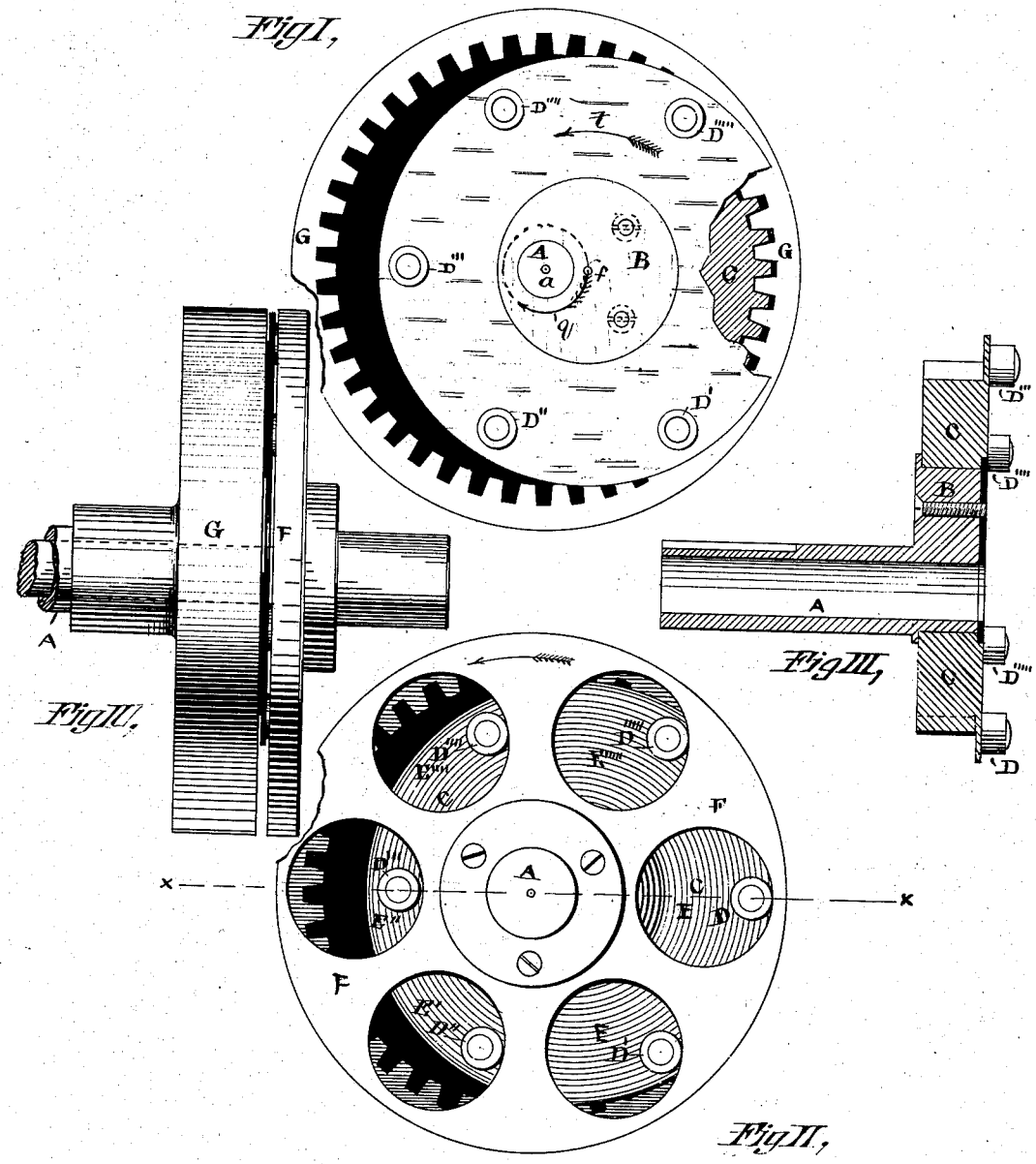

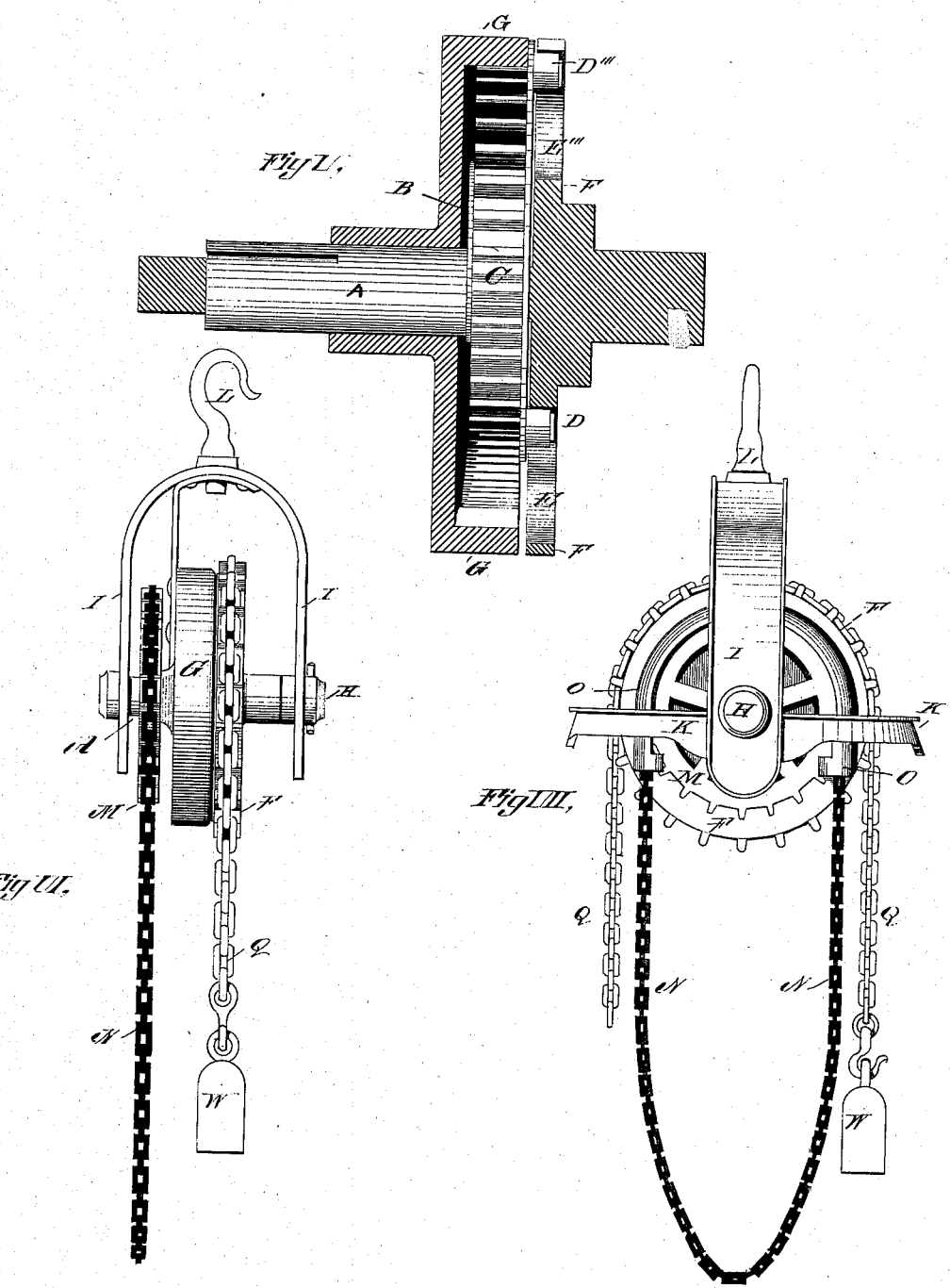

UNITED STATES PATENT OFFICE.

GEORGE F. CLEMONS, OF SPRINGFIELD, MASSACHUSETTS.

APPARATUS FOR TRANSMITTING DIFFERENTIAL ROTARY MOTION.

SPECIFICATION forming part of Letters Patent No. 276,776, dated May 1, 1883.

Application filed February 16, 1883. (No model.)

*To all whom it may concern:*

Be it known that I, GEORGE F. CLEMONS, a citizen of the United States, residing at Springfield, in the county of Hampden and State of Massachusetts, have invented new and useful Improvements in Apparatus for Transmittting Differential Rotary Motion, of which the following is a specification.

My invention consists in a new mechanical combination and movement adapted and arranged for transmitting differential rotary motion in mechanism by means of rollers or cams revolving on journals or stud-pins fixed in one wheel or disk, which roll or turn in round holes or recesses of another wheel or disk so arranged together and in combination with common eccentric differential gearing that the differential angular motion of the eccentric driving-gear, resulting from its differential angular motions about its eccentric axis and its axis of rotation, shall be transmitted to the driven gear, wheel, or disk for the purposes and uses of the common systems of differential gears, pulleys, or wheels.

In the accompanying drawings, forming part of this specification, consisting of three sheets, Figures I to V, inclusive, show my said invention adapted for ordinary purposes of differential gearing. Figs. VI and VII show my invention adapted for hoisting-tackle or chain-gear pulleys. Figs. VIII to XII, inclusive, are diagrams showing the relative positions and motions of the parts of the apparatus shown in Figs. I to V at and during each quarter-turn of the driving-shaft in one complete revolution of it.

Like letters of reference indicate like parts and motions of the apparatus in the several figures.

Referring to the said drawings, a main driving-shaft, A, has fixed on it an eccentric, B, which forms a journal-bearing for a spur-gear, C, said gear having an attached plate or disk, in which are fixed, equidistantly on its pitch-line, stud-pins forming journal-bearings of like rollers D D', &c., the peripheries of which rollers have separately and continuously rolling bearings in round holes or recesses E E', formed in a wheel or disk, F, which is concentric with and turns loosely upon or in shaft A. The shaft A also turns loosely in the hub of a concentric annular or internal gear, G, in which the eccentric spur-gear C meshes and rolls. When the annular gear G is fixed or held from turning on its axis, and the driving-shaft A is revolved by motive power applied to it in any direction, as in direction of arrow $q$, the driving spur-gear C will have two motions, one motion of it being around its eccentric axis $a$ in the direction of arrow $q$, and its other motion being on its axis of rotation $f$ in the opposite direction of arrow $t$; and the difference of these opposite angular motions of spur-gear C will be transmitted in equal angular motion to the driven disk F by means of the thrust-bearings of the rollers D D', &c., of gear C, revolving and working in the holes E E', &c., of disk F, so that if the spur-gear C and annular gear G have a ratio of diameters as 4 to 5 (or have thirty-two and forty gear-teeth, respectively) one revolution of the driving-shaft A will produce a resultant differential motion of spur-gear C on its axis $f$ in direction of arrow $t$ of one-fourth of a revolution, which differential angular motion of the eccentric driving-gear C will be transmitted to disk F.

If any rotary force of resistance be applied to the disk F in its plane of rotation, (the wheel G being fixed and the ratio of diameters of wheels C and G being not greater than four to five,) the said resistance force on disk F will be held fixedly without "running down" or revolving backward the disk F and driving-shaft A, because of the opposing leverage and friction acting through the described mechanism connecting disk F to the shaft A. The described and shown apparatus is therefore readily adapted for hoisting-machines, elevators, capstans, friction-brakes, and other resistance, self-sustaining, and power-moving machines.

In Figs. VI and VII, which show my described invention adapted for a chain-wheel hoisting-tackle, a supporting-shaft, H, is fixed at its its ends in a common hanger-frame, I, having a chain-guard, K, and suspending swivel-hook L. On shaft H is a loose sleeve-shaft, A, having fixed concentrically on it a horned chain-wheel, M, over which passes an endless chain, N, guarded on the horned chain-wheel M by a chain-guard, O. The sleeve-shaft A turns loosely and concentrically in the hub of an annular gear, G, fixed to a strap or plate, P, attached rigidly to the frame I. Within the fixed toothed wheel G is a spur-gear meshing with and rolling in and carried concentrically on an eccentric fixed on the sleeve-shaft A, forming the same combination as shown and described of shaft A, eccentric B, spur-gear C, and annular gear G in Figs. I to V. The spur-gear C has an attached plate or disk, in which are fixed stud-pins placed equidistantly on its pitch-line, and which carry rollers bearing and rolling in holes of a wheel, F, turning loose on shaft H, and having on its periphery chain-horns, over which pass a weight-hoisting chain, Q, with a weight, W, (shown supported on it,) the combination of spur-gear, C, and its rollers with the disk-holes in wheel F being the same as that shown and described of gear C, rollers D D', &c., and roller-holes E E' of disk F in Figs. I to V. A weight, W, attached to either of the two ends of the chain Q, will be self-sustained on the tackle by means of the described and shown connection of chain-wheel disk F to the fixed wheel G and frame H, so that by pulling on the hand-chain N the weight W may be raised or lowered at the will of the operator.

The principles of construction and operation of my invention may be more fully explained and understood by reference to and description of the diagram drawings, Figs. VIII to XII, inclusive, in which are indicated the relative positions and motions of the parts of the apparatus shown in Figs. I to V at and during each quarter-turn of the driving-shaft A in one complete revolution of it. In all the said diagram drawings three rollers and three disk-holes are shown in place of the six rollers and six disk-holes shown in Figs. I to V, for the reason that a set of three rollers and disk-holes show better in diagram illustration and answer well for the least practicable number that can be used in the apparatus. The scale of the diagrams is closely four-fifths of the scale of Figs. I to V, with the same proportion of the mechanism.

In the diagram drawings, A is the main driving-shaft, with its center at $f$. B is the eccentric fixed on shaft A, with its center at $f$. C is the spur-gear, rotating on eccentric B and axis $f$, and revolving in the annular gear G eccentrically around the axis $a$. D D' D'' are the rollers, turning on stud-pins fixed on gear C equidistantly in its pitch-line circle at points $g, h,$ and $i$. E, E', and E'' are the disk-holes of disk F, in which the rollers bear and turn, and whose centers are at points $k$ and $l$ and $m$ in the circle $k l m$ concentric to axis $a$, and of the same diameter as the pitch-circle $g h i$ of spur-gear C; and G is the fixed annular gear, whose pitch-circle is $g n o p$, in which the spur-gear C rolls, and which is loose on shaft A and concentric with it. The arrows $q q$ show the direction of rotation of shaft A, and the arrows $t t$ show the direction of rotation of gear C and disk F.

In tracing the movements of the several parts of the described mechanism through one revolution of the driving-shaft A in direction of arrow $q$, let Fig. VIII represent the relative positions of the parts at the commencement of the revolution of shaft A. Then Figs. IX, X, XI, and XII examined successively will show respectively the successive relative positions of the parts at each quarter-turn in one revolution of shaft A.

To aid in tracing the movement of the mechanism, let the right-angle lines $b a c$ and $d a e$, intersecting at the axis $a$ of the shaft A, indicate the five successive quarter-turn positions of shaft A. Also, let the three radial lines $f g$, $f h$, and $f i$, respectively connecting the axis $f$ of the spur-gear C with the centers $g, h,$ and $i$ of the rollers D D' D'', indicate the five simultaneous positions of gear C and its rollers D D' D''. Also let the radial lines $a k, a l,$ and $a m$, respectively connecting the axis $a$ of disk F with the centers $k, l,$ and $m$ of its disk-holes E, E', and E'', indicate the five simultaneous positions of disk F. Then by inspection of the diagrams the respective motions and positions of the parts of the mechanism will be found both at and during each quarter-turn of driving-shaft A, so that at the end of one revolution of shaft A in the direction of arrow $q$ it will be found that gear C and disk F will have been revolved on their respective axes one-fourth of a revolution in the direction of arrows $t t$. This resultant motion of gear C and disk F in the differential angular motion of gear C on its axis of revolution $a$ and on its eccentric axis of rotation $f$, the proportions of which motions are as four to five, or one to one and one-fourth, and the resultant motion is the difference of these opposite motions, which is, as shown, one-fourth a revolution of gear C on its axis $f$ in direction of arrow $t$, which is, by means of the rollers D D' D'' and disk-holes E E' E'', transmitted in equal angular motion and direction to the disk F. Any other different ratio of diameters of spur-gear C and annular gear G will produce proportionately differential resultant angular motions of gear C and disk F.

In further examination and explanation of the principles of construction and operation of my said invention and its modifications, the following specification is made: It will be observed that the rollers D D' D'' rotate on their respective axes $g, h,$ and $i$, and revolve respectively eccentrically and equally about the centers $k, l,$ and $m$ of the disk-holes E E' E'' with the same eccentric motion as the spur-gear C has about its axis of revolution $a$ and its axis of rotation $f$. This eccentric rotary motion of the rollers is indicated in Fig. VIII at the position of roller D and disk-hole E by the circle points $g, g', g'',$ and $g'''$, showing the center points of the rollers at the positions they take respectively in Figs. VIII, IX, X, and XI. Arrow $r$ indicates the direction of rolling motion of the rollers, and arrow $s$ indicates the direction and eccentricity of the eccentric motion of the centers of the rollers about the centers $k, l,$ and $m$ of the disk-holes E, E', and E'', in which they roll. The diameter of the circle of the centers of the disk-holes E E' E'' must be the same as the diameter of the pitch-circle of the spur-gear C. The diameters of the disk-holes E E', &c., must be equal to the sum of the diameters of any one of the rollers D D', &c., and the difference of the diameters of the spur-gear C and the annular gear G. The circle of the centers of the rollers may be greater or less than the pitch-circle of spur-gear C, provided that the circle of the centers of disk-holes are equally increased or diminished and made the same as the diameter of the circle of the roller centers. The spur-gear C may have an attached plate or disk in which are formed the roller-holes, and the disk F may carry the rollers working and bearing in the spur-gear disk-holes provided that the before-described principles of construction and arrangement of the engaging rollers and disk-holes are followed.

In place of the rollers working in the disk-holes, as shown and described, cams or eccentrics turning on the roller stud-pins and fitting and turning in the disk-holes may be used.

The fixed gear G may be made a spur-gear instead of an annular gear, and the eccentric-gear C be made an annular gear meshing with and rolling on the fixed spur-gear.

What I claim as my invention is—

1. The combination of mechanism consisting of a disk or wheel carrying a series of studs and rollers projecting from the face thereof, of a rotatable disk or wheel having circular perforations to receive said studs, and of mechanism, substantially as described, for imparting to said stud-bearing disk an eccentric rotating movement in the plane of its diameter and a rotary movement on its eccentric, all as set forth.

2. The combination of the shaft A, having thereon the eccentric B, the gear C, the fixed gear G, the stud-bearing disk secured to gear C, the rotatable perforated disk F, and a supporting-shaft therefor, substantially as described.

3. The combination of the suspending-frame I, the fixed gear G, secured to said frame, supporting-shaft H, the hollow shaft A, eccentric B, gear C, the stud-bearing disk secured to the latter, the horned disk F, chain Q, the chain N, and chain-wheel M, substantially as set forth.

GEORGE F. CLEMONS.

Witnesses:
WM. H. CHAPIN,
R. F. HYDE.